Patented July 6, 1926.

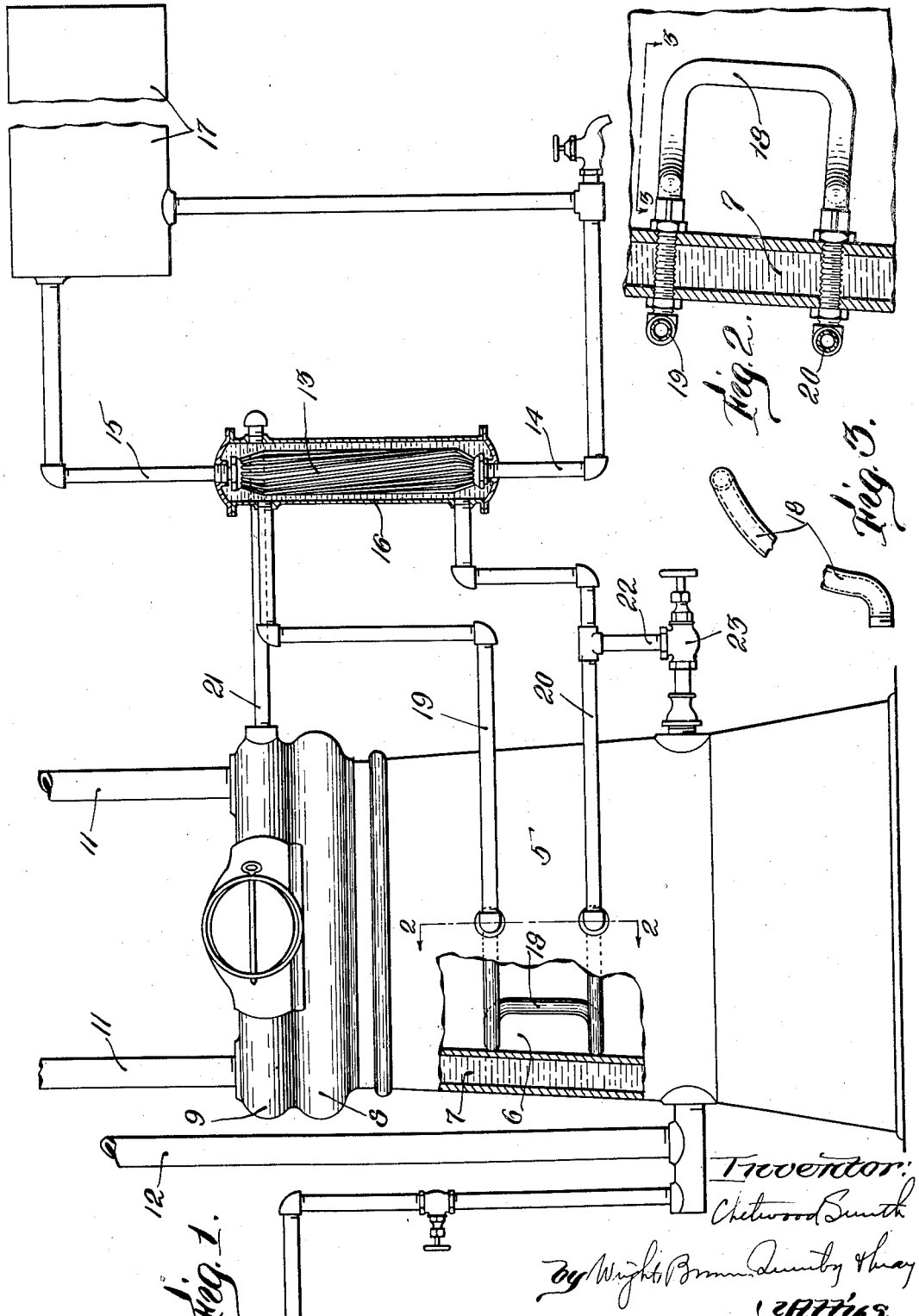

1,591,647

UNITED STATES PATENT OFFICE.

CHETWOOD SMITH, OF WORCESTER, MASSACHUSETTS.

INDIRECT DOMESTIC WATER-HEATING SYSTEM.

Application filed January 19, 1920. Serial No. 352,508.

The present invention relates to means for heating water for domestic use; and by "domestic use" I mean use for washing and analogous purposes in dwellings and buildings of all sorts occupied by human beings, where hot water is needed for any other purpose than as the circulating fluid in a heating system. More particularly my object is to use the heater or furnace of a hot water heating system as the generator by which to supply heat for heating water for domestic purposes; and further to do this in a manner and by means which supplies sufficient heat in mild weather when a slow fire is maintained in the furnace, and prevents overheating and possible damage to the apparatus and danger to occupants of the building, when the fire is made more brisk in cold weather. This object is accomplished by heating the domestic water in an indirect heater through thermal contact with circulating water which is heated in the furnace, and by providing means to permit flow of such circulating water into the water heating system when the temperature of the domestic water has been raised high enough. The means for accomplishing said object, and the principles which such means embody, constitute the present invention and are fully described and explained in the following specification with reference to the drawings furnished therewith.

In the drawings, Figure 1 is a diagram partly in elevation and partly in section of a heating system containing this invention.

Figures 2 and 3 are detail views of a heating coil used in connection with the apparatus shown in Figure 1.

Like reference characters designate the same parts in all the figures.

Figure 4:
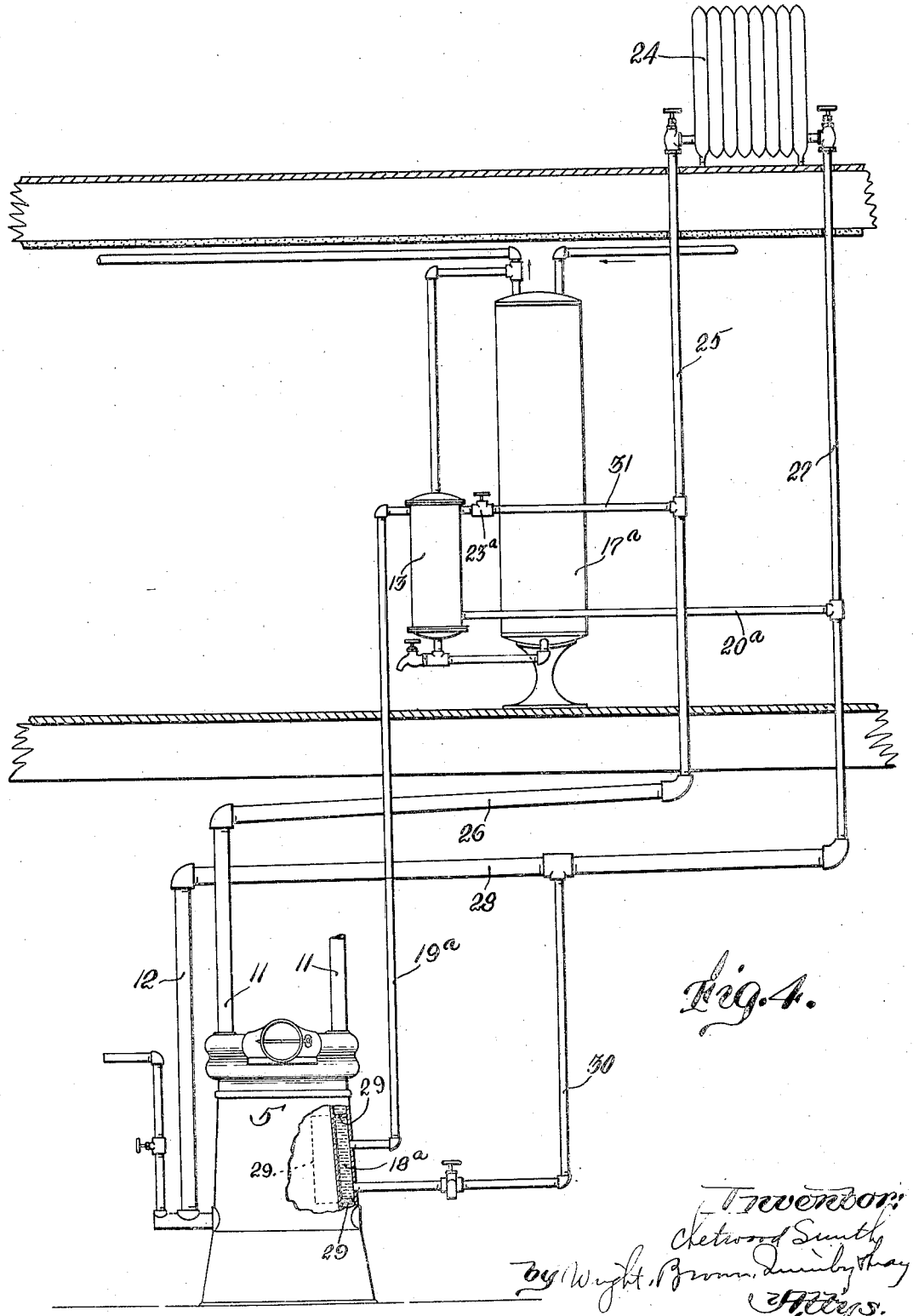
Figure 4 is a diagram of a modified form of the invention embodying the same principles.

Referring first to Figure 1, 5 represents the furnace of a hot water heating system, which may be of any type or make. This figure represents the back of the furnace and shows a part broken away at one side. Referring to the broken away part, 6 represents the interior or fire pot or fire space of the furnace; 7 represents a water leg surrounding the fire space; 8 and 9 represent water sections at the top of the furnace and, with the water leg 7, comprises what may be called the water space of the furnace; and 11, 11 and 12, represent the circulating pipes of the heating system, by which respectively hot water is carried away from the upper section to the radiators and spent water is returned to the lower part of the water leg.

13 represents a water heater by which water for domestic purposes, that is, for washing or any other purpose which requires the water to be drawn off from the pipes containing it, is heated. This heater comprises a set or coil or nest of tubes, or a conduit or passage, of any suitable character, to which water to be heated is supplied by a pipe 14 and from which the hot water is carried off by a pipe 15; and an outer shell, casing or jacket 16 furnishing a conduit or passage for the heating medium, such medium being in this case hot water. I call this an indirect heater in order to appropriate to it a distinguishing term and to indicate that the water drawn from it for use (which for the purposes of this specification I call "domestic water") is not directly heated by a flame, or auto-generative source of heat, but indirectly by a medium which receives heat primarily from an auto-generative source and delivers heat by thermal contact to the domestic water. For the purposes of this specification I will distinctively identify the heating medium just referred to by the term "circulating water." Water to be heated is supplied to the admission pipe 14 of the indirect heater from any source, and here both the receiving and delivery pipes of the heater are shown as connected to a tank 17, into which it may be assumed that cold water is delivered from the service main, and in which hot water is stored in the common way.

The shell or outer casing of the heater is connected with a coil or heating unit 18 in the fire space of the furnace, such connection being made by pipes 19 and 20 respectively connecting the upper terminal of the coil 18 with the upper part of the heater shell and the lower terminal of the coil with the lower part of said shell. There is also a connection from the upper part of the heater shell through a pipe 21 with the upper water section of the furnace, and a connection 22 from the pipe 20 to the lower part of the furnace water leg. In other words the upper and lower parts of the heater shell are also connected with the upper and lower parts of the water space of the furnace. A valve 23 is located in one of the connections between the heater and furnace, preferably in the lower connection 22, although it might with equivalent effect be located in the upper connection 21. The purpose of this valve is to restrict or choke the circulation between the furnace water space and the heater shell, the reason for which will presently appear from the following explanation of operation.

The coil 18 here shown is simply a U shaped length of pipe curved to lie close to the wall of the fire space and having ends which are attached to connections passing through the water leg and joined to the external connections 19 and 20. The purpose of this coil is obviously to bring the circulating water into close proximity with the furnace fire so that it will be highly heated even when a slow or dull fire is carried in the furnace. Other forms of coil having a greater or less length or area of heating surface than that here shown may be provided, and said coil may be considered as representative of any sort of water container whatever which is exposed directly to the heat of the fire, but is separated in any way from the water of the heating system.

This system or mode of heating water for domestic purposes is used only at such times and seasons of the year as require a fire in the furnace for heating the building, but at such times the operation is as follows. Water in the coil or heating section 18 becomes heated by the fire and flows through the connection 19 to the top of the heater shell. In the latter it becomes cooled by its thermal contact with the colder water in the coil or collection of tubes of the heater and descends, then flowing through the connection 20 back to the coil 18, and being again heated. In this way a continuous thermal circulation is set up and maintained, and the water for domestic purposes is constantly heated. As the coil 18 is next to the fire, it receives heat sufficient for the purpose even in those seasons of mild weather when not much heat is required for the building and the furnace fire is checked to a low or dull condition. In these conditions whatever amount of heat is needed may be furnished by making the coil 18 with great enough length and heating surface.

Now a heating element such as the coil 18 which carries enough heat from a slow fire would receive too much heat when the fire is forced into a brighter or hotter condition in colder weather, and would heat the domestic water to too high a temperature, and possibly generate steam with disastrous effect, if means were not provided to prevent these results. Such means are embodied in the secondary or relief connections 21 and 22 between the heater shell or casing and the water space of the furnace, and their function is to provide a second circulating path whereby the excess heat of the circulating water above that needed to heat the domestic water may be delivered to the heating system. The circulating water follows this second path whenever the temperature in the heater jacket becomes so high that the tendency to downward flow therein is less than the tendency to downward flow in the water space of the heater between the connections therewith of the pipes 21 and 22, as modified by the choke valve 23. That is, as the water in the furnace water leg is colder than that in the heating unit 18, a tendency always exists for water to flow from the pipe 19 through the pipe 21, into the furnace water space, thence through the circulating pipes 11 and return pipe 12 to the lower part of the water leg 7, and then out through the connection 22 to the pipe 20 and back to the heating unit. This tendency may be checked or wholly overcome by partly or wholly closing the choke valve 23. But when the choke valve is partly or wholly open both paths are available for the flow of the circulating water, and this water follows one or the other of these paths in greater proportion according as the cooling effect on the circulating water in the indirect heater is more or less intense or rapid. Thus when there is a large demand for domestic hot water and the flow through the tubes of the heater is rapid, or if the temperature of the water coming to the heater to be heated is very low, a marked cooling effect takes place on the circulating water in the shell of the heater, and most of the hot circulating water then flows through the heater; but when the domestic water has been heated to a high temperature so that the cooling effect on the circulating water is less rapid, and the circulating tendency there acting is less than that due to the relatively low temperature of the water in the furnace water leg (which is cooler than the water in the heating unit 18 due to the return of cool water from the house heating system), then the return flow of the circulating water through the furnace water leg preponderates over that through the heater shell. In this way a safeguard is provided against overheating the domestic water, and at the same time the excess heat of the circulating water is delivered into the house heating system and there economically used.

By appropriately adjusting the choke valve 23 the temperature to which the domestic water is heated may be correspondingly regulated. Thus its maximum temperature may be kept down to that of the water in the furnace water leg, or it may be caused to mount higher, for by choking the circulating path through the water leg, the path through the heater may be made of less resistance, even though the temperature in the heater is higher than that in the water leg. The location at which I have shown the choke valve is that which I prefer on account of its efficiency and convenience of installation and operation. This valve, however, may be located elsewhere, for instance, in the connection 21, because a choke valve applied anywhere to impede flow through the second or relief path will answer the purpose, and likewise for this purpose any construction of valve may be used which is adapted to be set in different more or less open or closed adjustments. However constructed, or wherever located, the choke valve, or its equivalent, is a regulating means having the function and effect of increasing or diminishing the resistance to flow of the circulating water through the secondary or relief path provided for its flow.

The form of installation of the invention hereinbefore described is that in which the domestic water heater is located near the furnace and the secondary path for the circulating water is provided by direct connections with the water space of the furnace. In Figure 4 is shown an arrangement embodying the same principles but differing in the fact that the water heater is further removed from the furnace and placed at a higher level, for example, in the kitchen of a dwelling wherein the furnace is in the cellar, and that both return paths for the circulating water are made through the pipes of the heating system. Here the furnace is designated 5 and the domestic water heater 13 as before. The storage tank for hot water is designated 17ª. 24 represents one of the radiators of the heating system connected by a riser 25 and a run 26 with one of the uptake pipes 11 of the furnace, and by a riser 27 and run 28 with the return pipe 12. This view shows also by way of illustration a modified form of heating unit for the circulating water, the same being a section 18ª of the furnace water leg closed in by webs or partitions 29 to make a compartment altogether separate from the rest of the water leg. The normal circulation of water between the heating unit and the water heater is through the pipe 19ª to the heater jacket, and from the latter through the pipe 20ª to the return riser 27 of the radiator, the return run 28, and a branch 30 to the lower connection of the heating unit. The secondary path corresponding to that provided by the pipes 21 and 22 previously described is provided by a pipe 31 leading from the heater shell to the radiator supply riser 25, and thence by the piping of the heating system to the pipe 30 and auxiliary heating unit 18ª. A choke valve 23ª in the pipe 31 performs the same office as the choke valve 23. In function and mode of operation the system last described is equivalent to that first described.

By the means thus explained it is made possible to use the furnace whenever a fire, even a slow one, is maintained therein, for heating water to as high a temperature as is ordinarily needed for domestic purposes such as bathing, washing household utensils and clothing, and so forth; while at the same time safeguards are provided to avoid overheating of the domestic water or of the circulating system containing the water provided for such heating. This invention is adapted for use only in connection with a hot water heating system, but within this limitation it may be applied in various ways, other than those here shown, to all types of such systems all of which are within the scope of my claim to protection herein.

In the foregoing description I have applied certain identifying terms to the various parts of the apparatus in order conveniently to distinguish these parts from one another in the interest of clarity and brevity of description, but without intending any limitation in the scope of my claimed protection. These terms are used in the following claims with the same purpose and intent, and are to be construed accordingly.

What I claim and desire to secure by Letters Patent is:

1. The combination with the furnace of a main water heating system, of an indirect heater, an auxiliary heating unit in said furnace, connections providing for the circulation of hot water through said auxiliary heating unit and said indirect heater under normal temperature conditions, and connecting means providing a secondary passage for the circulating heating water after it has passed through said indirect heater to said main heating system and through the water in said main heating system when the circulating heating water becomes overheated.

2. The combination of an indirect domestic water heating apparatus comprising a water heater having interior conducting means for the water to be heated and an outer shell for the circulating heating water, a heating furnace forming the heat generator of a main water heating system, an auxiliary heating unit in said furnace for the circulating heating water, connections between the outlet and inlet of said auxiliary heating unit and the upper and lower parts of said shell respectively, and a relief connection from the upper part of said shell to a relatively higher portion of said heating system, a relatively lower portion of said heating system being connected to said auxiliary heating unit and thereby providing with said relief connection a secondary path for water flowing through said auxiliary heating unit.

3. Means for heating water for domestic use indirectly from the furnace of a main heating system comprising an indirect heater having separate channels for the water to be heated and for circulating heating water respectively, an auxiliary heating unit in the furnace having connections with the channel for circulating heating water, and connecting means providing for a return flow of said circulating heating water after it has passed through said indirect heater, from said indirect heater to said auxiliary heating unit through the water of said main heating system.

4. The combination with a main hot water system and the furnace thereof, of an indirect domestic water heater having conducting means therein for the water to be heated and a conduit therein for the circulating heating water, an auxiliary heating unit in the furnace, connections forming with said auxiliary heating unit and said conduit a normal circuit for said circulating heating water, and means connecting said normal circuit and said main heating system and providing a secondary path of flow for said circulating heating water after it has passed through said indirect heater, from said indirect heater into said main heating system under abnormal conditions, whereby excess heat in said circulating heating water may be transferred to the mass of water in said main heating system.

5. The combination with a main hot water heating system and the furnace thereof, of an indirect domestic water heater having conducting means therein for the water to be heated and a conduit therein for the circulating heating water, a heating unit in the furnace, connections forming with said auxiliary heating unit and said conduit a normal circuit for said circulating heating water, means connecting said normal circuit and said main heating system and providing a secondary path of flow for said circulating heating water after it has passed through said indirect heater, from said indirect heater into said main heating system under abnormal conditions, whereby excess heat in said circulating heating water may be transferred to the mass of water in said main heating system, and regulating means to increase or diminish the resistance to flow of the circulating heating water through said secondary path.

6. The combination with the furnace of a hot water heating system, of an indirect domestic water heater, a separate heating unit in the furnace, connections providing a circulating path for water between said unit and said indirect heater, connecting means providing a secondary or relief path for the circulating water after it has passed through said indirect heater, from the indirect heater into the heating system, and means for varying the resistance to flow through the secondary path.

7. The combination with the furnace of a hot water heating system, of an indirect domestic water heater, a separate heating unit in the furnace, connections providing a circulating path for water between said unit and said indirect heater, connecting means providing a secondary or relief path for the circulating water after it has passed through said indirect heater, from the indirect heater into the heating system, and a choke valve in the secondary path adjustable to impede in a greater or less degree the flow of circulating water through said secondary path.

8. The combination with the furnace of a hot water heating system, of an indirect domestic water heater, a separate heating unit in the furnace, connections providing a circulating path for water between said unit and said indirect heater, and connecting means providing a secondary or relief path for the circulating water direct from the circulation space of said indirect heater to said main heating system and from said main heating system into the return path of the circulating heating water.

In testimony whereof I have affixed my signature.

CHETWOOD SMITH.